Sept. 19, 1967 AKIRA MATSUSHITA ETAL 3,342,221

POWER LOOM FOR WEAVING MAGNETIC MEMORY DEVICES

Filed June 2, 1965 2 Sheets-Sheet 1

INVENTORS
AKIRA MATSUSHITA
CHIKARA UCHIDA

Sept. 19, 1967 AKIRA MATSUSHITA ETAL 3,342,221

POWER LOOM FOR WEAVING MAGNETIC MEMORY DEVICES

Filed June 2, 1965 2 Sheets-Sheet 2

INVENTORS
AKIRA MATSUSHITA
CHIKARA UCHIDA

United States Patent Office 3,342,221
Patented Sept. 19, 1967

3,342,221

POWER LOOM FOR WEAVING MAGNETIC MEMORY DEVICES

Akira Matsushita, Kitatama-gun, Tokyo-to, and Chikara Uchida, Setagaya-ku, Tokyo-to, Japan, assignors to Toko Kabushiki Kaisha, Tokyo-to, Japan, a joint-stock company of Japan Filed June 2, 1965, Ser. No. 460,623
Claims priority, application Japan, June 5, 1964, 39/31,800
1 Claim. (Cl. 139—304)

This invention relates to fabric weaving looms and to magnetic memory devices of woven fabric form, and more particularly it relates to a new power loom for weaving woven matrix type, magnetic memory devices (hereinafter to simply as memory devices).

It is an object of the present invention to provide a power loom for weaving memory devices wherein, in addition to continuous weaving operation, a part of the woven memory devices can be readily taken out when necessary without causing a disarray of the warp wires, whereby continuous weaving operation can be resumed rapidly and without troublesome procedure.

Briefly stated, the present invention resides in a device for taking out parts of the woven memory devices in a power loom of the above stated character, said device comprising in combination a moving head disposed above the cloth beam drum of the loom and adapted to be translationally movable in a direction perpendicular to the axis of said drum, a first clamp for clamping the warp wires of a part of the woven memory devices to be taken out, a second clamp for clamping warp wires contiguous to said part to be taken out, each of the first and second clamps being mountable on or dismountable from the moving head, and a flexible member coupling the moving head and the circumferential surface of the cloth beam drum thereby to cause said drum to pull said moving head to move in the direction to pull said part to be taken out.

The nature, principle, and details of the invention will be more clearly apparent from the following detailed description when taken in conjunction with the accompanying drawings in which like parts are designated by like reference numbers and characters, and in which.

As conducive to an understanding of the present invention the weaving of a woven matrix type memory device will first be considered.

Figure 1:
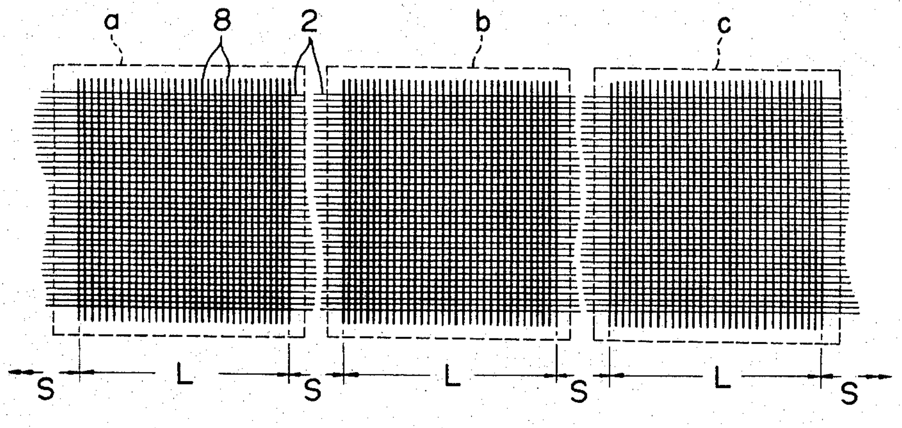
FIGURE 1 is a planar view showing woven type, magnetic memory devices woven continuously.

Referring to FIGURE 1, one matrix unit is formed by weaving in a space interval of length L a specific number of thin-film magnetic wires 8 (for example, conductor wires coated with thin-film magnetic material) as weft members through warp members consisting of conductor wires 2 (in some cases with spacer wires interwoven therebetween). Then, after an unwoven space S is left, another unit matrix of length L is again woven. This procedure is repeated to accomplish continuous weaving, whereby a series of unit matrices each of length L at space intervals of S therebetween are woven. Finally, these units are separated by cutting into units *a*, *b*, *c*, etc., as final products. If necessary, of course, these units may cut into sets each of two or three contiguous units.

During a continuous weaving operation of this nature, it is very difficult to take out one matrix unit or a number of units for purposes such as sampling. The reason for this is, of course, that if only one part is cut out, the remaining warp wires will become disarrayed, and it will become necessary to set up the power loom for weaving from the beginning.

The present invention contemplates overcoming this difficulty by providing an attachment operable as a part of the take-up mechanism of a power loom wherein, in addition to continuous weaving operation, one or more desired matrix units can be separated by cutting and taken out at will when necessary.

Figure 2:
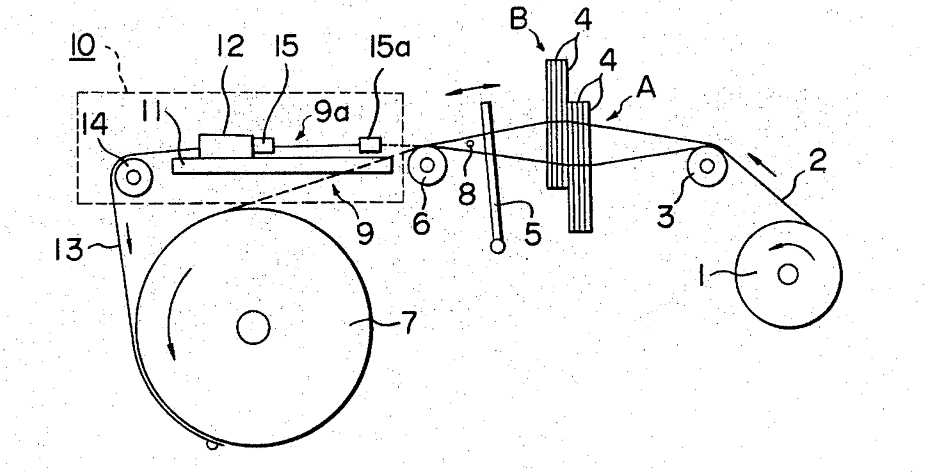
FIGURE 2 is a schematic side elevational view showing the essential parts of a preferred embodiment of the power loom according to the invention.

The details of the invention will now be described with respect to a preferred embodiment thereof as illustrated in FIGURE 2, which schematically shows the essential parts of the entire power loom in side elevational view.

For continuous weaving operation, a large number of warp conductor wires 2 previously wound on a warp beam drum 1 (on the right-hand side as viewed in FIGURE 2) are passed over a guide roller 3, through a selected number of heald frames 4 through reed 5, over another guide roller 6 and are then taken up on a cloth beam drum 7.

The heald frames 4 which are divided into two sets A and B as shown are adapted to move alternately up and down (in the case of plain weave), whereby the warp wire group passing through the heald frame A and the warp wire group passing through the heald frame B are alternately opened up and down in the space interval between guide rollers 3 and 6, and at each opening action, a thin-film magnetic wire 8 is passed transversely through the resulting opening at a point to the left of the reed 5. The reed 5 undergoing oscillation then beats this magnetic wire 8, and the resulting continuously woven memory device 9 is taken up on the cloth beam drum 7.

Figure 3:
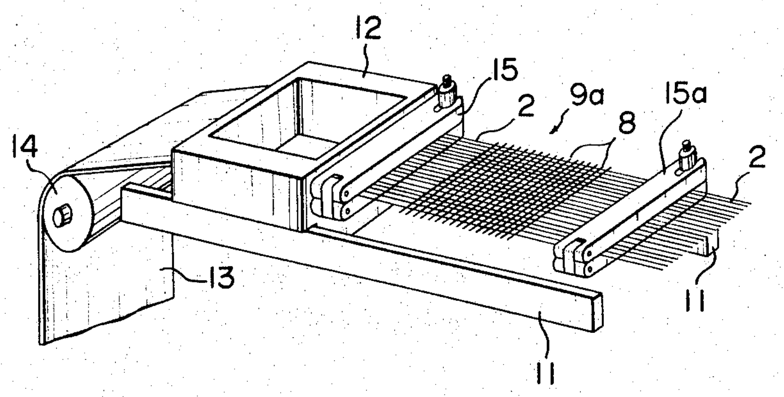
FIGURE 3 is a partial perspective view showing an example of the matrix unit take-out device according to the invention.

When a selected number of matrix units are to be taken out, a unit take-out device 10 provided on the left-hand side of the guide roller 6 as described below is used. Referring to FIGURES 2 and 3, parallel rails 11 are installed above the cloth beam drum 7 in a substantially horizontal, left and right direction. A sliding head 12 is placed on these rails 11 to slide left and right therealong. To this sliding head 12 there is coupled a thin steel sheet 13 for pulling the sliding head toward the left. The steel sheet 13 is passed over a guide roller 14 and has an end part which can be anchored on the circumferential surface of the cloth beam drum 7. Accordingly, rotation of the cloth beam drum 7 causes the sliding head 12 to be pulled toward the left. Instead of this thin steel sheet 13, of course, a known flexible material such as one or more lengths of rope may be used.

On the right side surface of the sliding head 12, a clamp 15 for clamping the warp wires 2 is mounted in a freely mountable and dismountable manner by means of bolts and nuts. Another clamp 15*a* of exactly the same shape and dimensions as clamp 15 is provided to clamp the warp wires 2 at a point immediately to the left of the guide roller 6.

Figure 4:
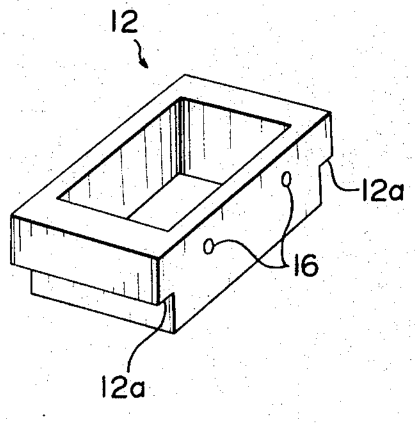
FIGURE 4 is a perspective view showing a sliding head suitable for use in the unit take-out device of the power loom according to the invention.
Figure 5:
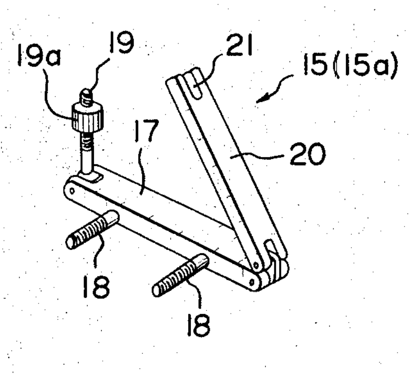
FIGURE 5 is a perspective view showing one example of a clamp suitable for use in the unit take-out device of the power loom according to the invention.

The sliding head 12, as more clearly shown in FIGURE 4, is provided with sliding surfaces 12*a* for sliding along the rails 11 and with through holes 16 for clamp mounting. Each of the clamps 15 and 15*a* comprises an arm 17 in which there are fixedly imbedded bolts 18, as shown in FIGURE 5, which are inserted into the holes 16 for mounting the clamp and held by nuts (not shown) screwed thereon from the inner side of the sliding head 12. It is possible, of course, to use any of various other kinds of means for removably mounting the clamps.

Each of the clamps 15 and **15*a* comprises a stationary arm 17, a swinging arm 20, and a threaded swinging bolt 19 pivoted at the free end of the arm 17 and provided with a nut 19*a*, the free end of the arm 20 being provided with an open slot 21 with which the bolt can be engaged, whereby the arm 20 can be forced by tightening of the nut 19*a* to exert clamping force relative to an article placed between the arms 20 and 17**.

To take out a selected number of matrix units prior to the start or resumption of continuous weaving by using the unit take-out device 10, the sliding head 12 is coupled by the sheet 13 to the cloth beam drum 7 and then moved toward the right to a position close to the guide roller 6, at which position the warp wires 2 are then clamped by the clamp 15 mounted on the sliding head 12. Then, when the partial weaving operation is carried out, the resulting woven memory device **9*a* passes over the guide roller 6 and is pulled out above the rails 11**.

Then, when the desired number of units have been woven, the partial operation is stopped, and the part of the space S as indicated in FIGURE 1 at the final end of the units is clamped by means of the clamp **15*a*. The warp wires 2 are then cut at the left-hand side of this clamp 15*a*, and the clamp 15 is loosened, whereupon the desired number of units of the memory device 9*a*** can be taken out.

When this operation is to be carried out again, the cloth beam drum 7 is rotated in reverse direction, and the sliding head is moved toward the right. Then the clamp 15 is dismounted from the sliding head 12 and replaced by the clamp **15*a* still clamping the warp wires 2**.

When the loom is to be switched from partial to continuous weaving, the steel sheet 13 is disconnected from drum 7, and the ends of the warp wires 2 which remain attached to clamp **15*a* are conducted to drum 7 and fixed thereon, and clamp 15*a*** removed. Continuous weaving can then be resumed without causing disarray of the warp wires.

By the use of the power loom according to the invention as described above, both continuous weaving and taking out of matrix units can be freely carried out.

Moreover, since the cloth beam drum pulls the sliding head at the same speed as that for direct take-up of the woven memory device, even in the case when matrix units are to be taken out, the troublesome procedure of converting the weaving speed for the purpose of this changeover can be advantageously dispensed with.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What we claim is:

In a power loom for weaving magnetic memory devices, a take-up mechanism operable with a cloth beam drum for taking up individual woven memory devices formed from continuous warp wires, the improvements which comprise, in combination, a moving head disposed above the cloth beam drum and adapted to be translationally movable in a direction perpendicular to the axis of said drum, a pair of rails mounting said head and operative to limit its length of travel; a first clamp for clamping said warp wires at one end of said memory device; a second clamp for clamping said warp wires at the opposite end of said memory device; said first and second clamps being interchangeably connectable to and disconnectable from said moving head, said first clamp being connected to said head while the desired fabric length is drawn off where upon the memory device is removed from the loom; and a flexible member attached to said moving head and anchored to the circumferential surface of the cloth beam drum thereby causing the head to move in register with the cloth beam drum.

References Cited

UNITED STATES PATENTS

| | | | |
|---|---|---|---|
| 3,018,801 | 1/1962 | Coon et al. | 139—29 |
| 3,217,752 | 11/1965 | Sutcliffe | 139—20 |
| 3,237,650 | 3/1966 | Dickerson | 139—20 X |

MERVIN STEIN, *Primary Examiner.*

H. S. JAUDON, *Assistant Examiner.*